United States Patent
Lauzon et al.

(10) Patent No.: US 11,009,897 B2
(45) Date of Patent: May 18, 2021

(54) REMOTE SEAL SYSTEM WITH IMPROVED TEMPERATURE COMPENSATION

(71) Applicant: Rosemount Inc., Shakopee, MN (US)

(72) Inventors: David R. Lauzon, Hopkins, MN (US); Scott R. Thompson, Lakeville, MN (US)

(73) Assignee: Rosemount Inc., Shakopee, MN (US)

( * ) Notice: Subject to any disclaimer, the term of this patent is extended or adjusted under 35 U.S.C. 154(b) by 144 days.

(21) Appl. No.: 16/234,900

(22) Filed: Dec. 28, 2018

(65) Prior Publication Data
US 2020/0209899 A1    Jul. 2, 2020

(51) Int. Cl.
*G01L 9/12* (2006.01)
*G05D 16/06* (2006.01)
(Continued)

(52) U.S. Cl.
CPC .......... *G05D 16/0638* (2013.01); *G01L 9/025* (2013.01); *G01L 9/125* (2013.01);
(Continued)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

| 4,449,569 | A | | 5/1984 | Lisi et al. | |
| 4,722,228 | A | * | 2/1988 | Awa | G01F 23/164 73/301 |

(Continued)

FOREIGN PATENT DOCUMENTS

| WO | 80/02593 A1 | 11/1980 |
| WO | 1996027124 A1 | 9/1996 |

OTHER PUBLICATIONS

"Rosemount DP Level Fill Fluid Specification" Technical Note, Emerson Spetember 2017, 18 pages.
(Continued)

*Primary Examiner* — Andre J Allen
(74) *Attorney, Agent, or Firm* — Christopher R. Christenson; Kelly, Holt & Christenson PLLC (57) ABSTRACT

A remote seal system includes a remote diaphragm having a first side configured to be exposed to a process fluid. A conduit is coupled to the remote diaphragm and includes a fill fluid in fluidic communication with a second side of the remote diaphragm. A temperature sensor is thermally coupled to the conduit and configured to sense a temperature of the fill fluid. In one alternative example, a remote sensing assembly includes a flexible elongate conduit having a first end coupled to a remote diaphragm in fluidic communication with a process fluid and a second end extending a length from the first end to a process fluid pressure transmitter. A substantially incompressible fill fluid is disposed within the flexible elongate conduit. The process fluid pressure transmitter is configured to generate an output value indicative of pressure in the process fluid based on a corresponding pressure in the fill fluid. A temperature detector is coupled to the flexible elongate conduit and is configured to provide a signal indicative of an average temperature of the fill fluid along the flexible elongate conduit. A compensation system calculates a thermal expansion value based on the average temperature and adjusts the pressure signal based on the thermal expansion value.

20 Claims, 7 Drawing Sheets

(51) Int. Cl.
*G05D 23/22* (2006.01)
*G05D 23/19* (2006.01)
*G05D 16/08* (2006.01)
*G01L 9/02* (2006.01)

(52) U.S. Cl.
CPC .......... *G05D 16/08* (2013.01); *G05D 23/193* (2013.01); *G05D 23/22* (2013.01)

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; G01F 1/34; G01F 1/42; G01F 1/36; G01F 15/06; G01F 15/061; G01F 1/363; G01F 1/38; G01F 1/44; G01F 23/164; G01F 25/0007
USPC .................................................. 73/700–756
See application file for complete search history.

(56) References Cited

U.S. PATENT DOCUMENTS

| | | | |
|---|---|---|---|
| 4,779,626 A | 10/1988 | Peel et al. | |
| 5,811,690 A | 9/1998 | Hershey | |
| 6,510,740 B1* | 1/2003 | Behm | G01D 1/00 73/708 |
| 6,823,738 B1* | 11/2004 | Wlodarczyk | G01L 19/04 73/705 |
| 6,890,095 B2 | 5/2005 | Gul | |
| 8,276,457 B2 | 10/2012 | Philipps | |
| 8,370,088 B2 | 2/2013 | Ammouri et al. | |
| 8,627,643 B2 | 1/2014 | Chillar et al. | |
| 2001/0054308 A1 | 12/2001 | Komiya et al. | |
| 2002/0196837 A1 | 12/2002 | Gul | |
| 2007/0272027 A1 | 11/2007 | Hedtke | |
| 2010/0083731 A1* | 4/2010 | Hedtke | G01L 27/007 73/1.57 |
| 2010/0083768 A1* | 4/2010 | Hedtke | G01L 27/007 73/724 |
| 2010/0275699 A1* | 11/2010 | Seeberg | G01L 19/0023 73/756 |
| 2013/0074604 A1* | 3/2013 | Hedtke | G01F 1/36 73/753 |
| 2013/0319074 A1* | 12/2013 | Sittler | G01F 25/0007 73/1.35 |
| 2014/0327919 A1* | 11/2014 | Jaaskelainen | G01L 11/025 356/480 |
| 2015/0268111 A1* | 9/2015 | Hedtke | G01L 13/02 73/700 |
| 2016/0061025 A1 | 3/2016 | Sidorova et al. | |
| 2017/0234840 A1 | 8/2017 | Broeker | |
| 2020/0096404 A1* | 3/2020 | Fadell | G01L 9/125 |
| 2020/0103260 A1* | 4/2020 | Willcox | G01L 19/0092 |

OTHER PUBLICATIONS

International Search Report and Written Opinion for International Patent Application No. PCT/US20191067861, dated Apr. 21, 2020, date of filing: Dec. 20, 2019, 13 pages.

* cited by examiner

REMOTE SEAL SYSTEM WITH IMPROVED TEMPERATURE COMPENSATION

BACKGROUND

In some process control system installations, a pressure transmitter is used to remotely monitor the pressure of a process fluid in a conduit or storage tank. The pressure transmitter includes circuitry that measures or otherwise obtains an electrical indication of a pressure sensor that is fluidically coupled to a remote location where the pressure is monitored. The magnitude of the pressure sensor signal represents the pressure of the process fluid at the remote location.

Remote seals, or remote diaphragm assemblies, are sometimes used to space the pressure transmitter (which includes a number of electronic circuits) from the hazardous measurement environments or for coupling the pressure transmitter to process fluid measurement locations that are inconveniently located. For example, remote process seals can be used with corrosive, high temperature process fluids such as those used in refineries or chemical plants. In such instances, the mechanical remote seal, having a diaphragm assembly and a capillary tube, is used to relate the pressure from the remote location to the pressure transmitter which is located a safe distance away. A flexible diaphragm in the remote seal isolates the process fluid from fill fluid in the capillary tube. As the isolation diaphragm moves, the fill fluid (which is substantially incompressible) translates pressure changes through the capillary tube to a pressure sensor located in or on the pressure transmitter. The pressure sensor, which may include a sensing diaphragm, of the pressure transmitter senses the remote pressure through the fill fluid and produces a signal related to the pressure of the process fluid.

Capillary tubes can extend tens of meters in order to couple the pressure transmitter with the process fluid. Because of costs and difficulty associated with customizing the length of the capillary tube, remote seal assemblies are typically made available with stock lengths of capillary tube. The significant lengths of the capillary tubes and the thermal expansion and/or other thermal characteristics of the capillary tube and/or fill fluid can generate temperature-induced errors in the measurement from the pressure sensor. Accordingly, providing an improved remote seal system with temperature compensation will improve the accuracy of such remote seal systems and thus facilitate more effective process control.

SUMMARY

A remote seal system includes a remote diaphragm having a first side configured to be exposed to a process fluid. A conduit is coupled to the remote diaphragm and includes a fill fluid in fluidic communication with a second side of the remote diaphragm. A temperature sensor is thermally coupled to the conduit and configured to sense a temperature of the fill fluid. In one example, a remote sensing assembly includes a flexible elongate conduit having a first end coupled to a remote diaphragm in fluidic communication with a process fluid and a second end extending a length from the first end to a process fluid pressure transmitter. A substantially incompressible fill fluid is disposed within the flexible elongate conduit. The process fluid pressure transmitter is configured to generate an output value indicative of pressure in the process fluid based on a corresponding pressure in the fill fluid. A temperature detector is coupled to the flexible elongate conduit and is configured to provide a signal indicative of an average temperature of the fill fluid along the flexible elongate conduit. A compensation system calculates a thermal expansion value based on the average temperature and adjusts the pressure signal based on the thermal expansion value.

DETAILED DESCRIPTION OF ILLUSTRATIVE EMBODIMENTS

As set forth above, remote seal systems generally include capillaries to transfer pressure from one or more distant measurement points to pressure sensors for measurement. In instances where the capillary tube runs vertical or even has a component that is vertical, the hydrodynamic pressure of the fill fluid can cause an error in the pressure measurement. Further, the density of the fill fluid in the capillaries can change with temperature, which can cause further error in the pressure measurement proportional to density change and the height of the capillary leg. Further still, temperature-induced thermal expansion or contraction of the fill fluid within the capillary as well as the material of the capillary itself can also generate additional sources of error.

Because the density is principally dependent on temperature, temperature induced changes in density can be mathematically compensated using a processing system, such as a microprocessor of a pressure transmitter or computer in a process control room. One difficulty in providing such compensation is that the temperature can actually vary across the entire length of the capillary tube. Such variations can be caused by partial sun or partial shade on portions of the capillary tube, partial exposure to process conditions or ambient temperature gradients. This can make it difficult to use a single point measurement to provide an adequate representation of the temperature of the remote seal installation. Additionally, it is difficult to install an external temperature sensor onto the capillary or in nearby ambient conditions in order to perform thermal compensation because such compensation would often require running additional conduit and wiring to the installation.

Embodiments provided herein generally facilitate obtaining an accurate representation of the entire capillary temperature gradient via a specialized temperature sensor that is manufactured with, or assembled onto, the capillary. The specialized sensor can provide a single quantity, such as a temperature-based resistance or a temperature-based voltage that is indicative of an average or other aggregate function of temperature across the entire capillary.

Figure 1:
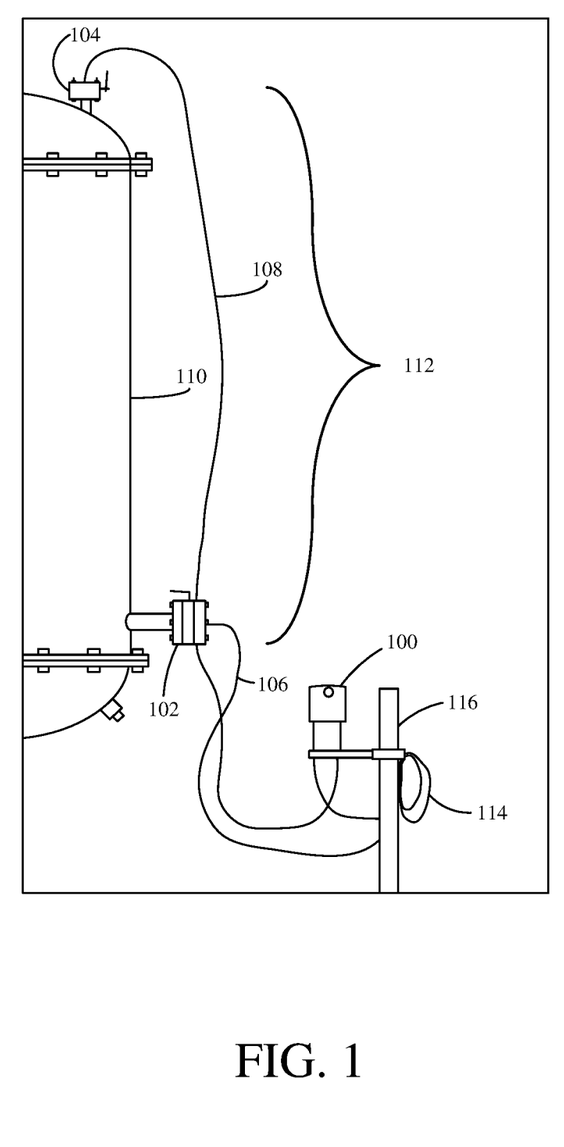
FIG. 1 is a diagrammatic view of a process fluid pressure measurement system using a remote seal with capillary compensation in accordance with an embodiment of the present invention.

FIG. 1 is a diagrammatic view of a process fluid pressure measurement system using a remote seal with capillary compensation in accordance with an embodiment of the present invention. As shown in FIG. 1, pressure transmitter 100 is fluidically coupled to remote seals 102, 104 via respective capillary tubes 106, 108. Capillaries 106, 108 may be tens of meters long. However, as defined herein, a capillary tube is a flexible elongate conduit having a length of at least one meter.

In the example shown, the remote seals are operably coupled to a fluid containment tank 110. Sometimes, the difference in pressure between the indications from remote seal 104 and remote seal 102 can provide an indication of fluid level within tank 110. As shown, capillary 108 has a significant vertical component indicated by bracket 112. Additionally, capillary 106, though having less of a vertical component, as a significant portion of extra capillary line wound into a coil 114 and mounted to stand 116. As can be appreciated, capillary 108 may be positioned in direct sunlight, while capillary 106 may be in the shade. Further, coil 114 which is shown positioned lower than capillary 108 may be at a somewhat different temperature than capillary 108 due to its proximity to the ground. Further, if tank 110 is at an elevated temperature, the proximity of capillary 108 to tank 110 can cause capillary 108 to be warmer than capillary 106 which is primarily wound in coil 114 disposed away from tank 110. Thus, real-world installation details can generate a very complex thermal system that can have an effect on the pressure that is ultimately read by a pressure sensor within process fluid pressure transmitter 100 from capillary tubes 106, 108.

Figure 2:
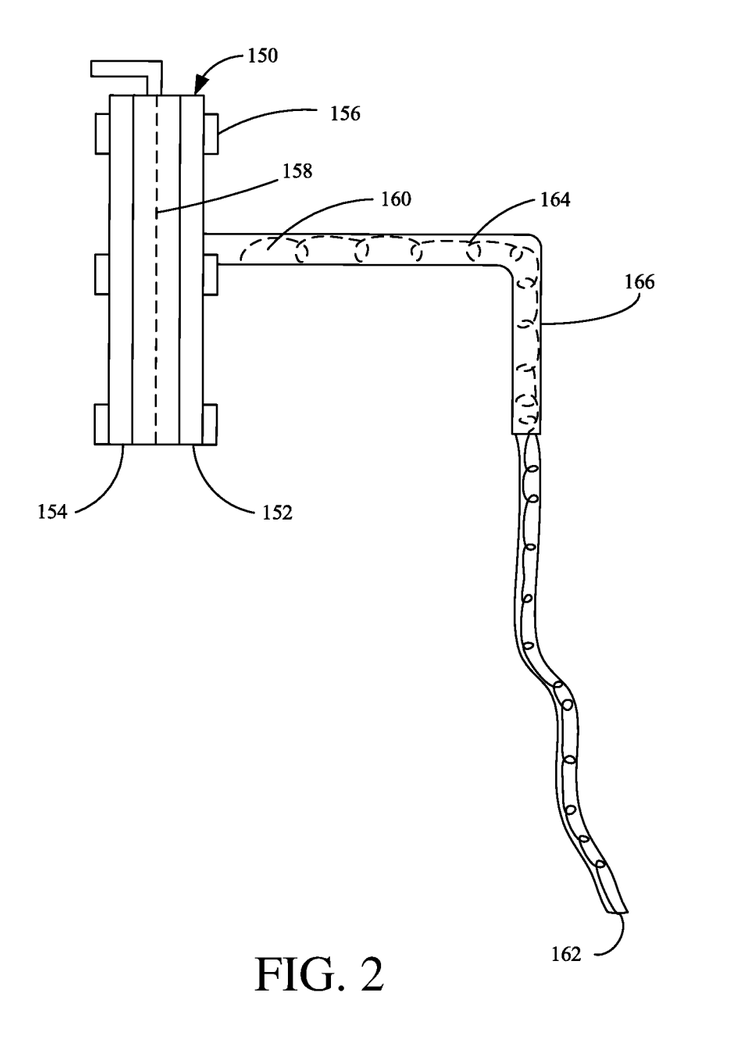
FIG. 2 is a diagrammatic view of a remote seal system in accordance with an embodiment of the present invention.

FIG. 2 is a diagrammatic view of a remote seal system in accordance with an embodiment of the present invention. Remote seal system 150 includes a pair of mounting flanges 152, 154 that mount together via a bolted flange connection 156 to sealingly provide isolation diaphragm 158 in direct contact with process fluid of a process fluid container or conduit, such as tank 110. The process fluid conduit is not shown in FIG. 2, but would be positioned on the left side of flange 154. The side of isolation diaphragm opposite the process fluid is in fluidic contact with a fill fluid 160 that is fluidically coupled to a pressure transmitter or sensor, such as process fluid pressure transmitter 100 via end 162.

In accordance with an embodiment of the present invention, an averaging RTD element 164 is wound about capillary 166 and extends, in one embodiment, substantially the entire length of capillary 166. Averaging RTD 164 is, in one embodiment, a thin, insulated wire whose material has a resistance that is proportional to the temperature and distance. Although the resistance of most RTD materials is somewhat non-linear with respect to high precision measurements, it is sufficiently linear for providing an effective average temperature for the capillary at the typical temperature ranges for capillary installations. The same is also true for fill fluids for capillaries with respect to density over temperature. Averaging temperature sensor 164 is coupled to suitable electronics, within process fluid pressure transmitter 100, or a separate temperature transmitter, in order to determine an average temperature value based on the resistance of the sensor. This average temperature value can then be used to compensate the remote process fluid pressure value for variations in temperature-dependent density and/or thermal expansion or contraction. In one embodiment, this compensation may be performed using a lookup table stored within a processor of process fluid pressure transmitter 100, or any suitable process controller. Accordingly, it is noted that the actual compensation may take place within process fluid pressure transmitter 100, or another suitable device, such as a computer located at a process control room.

Figure 3:
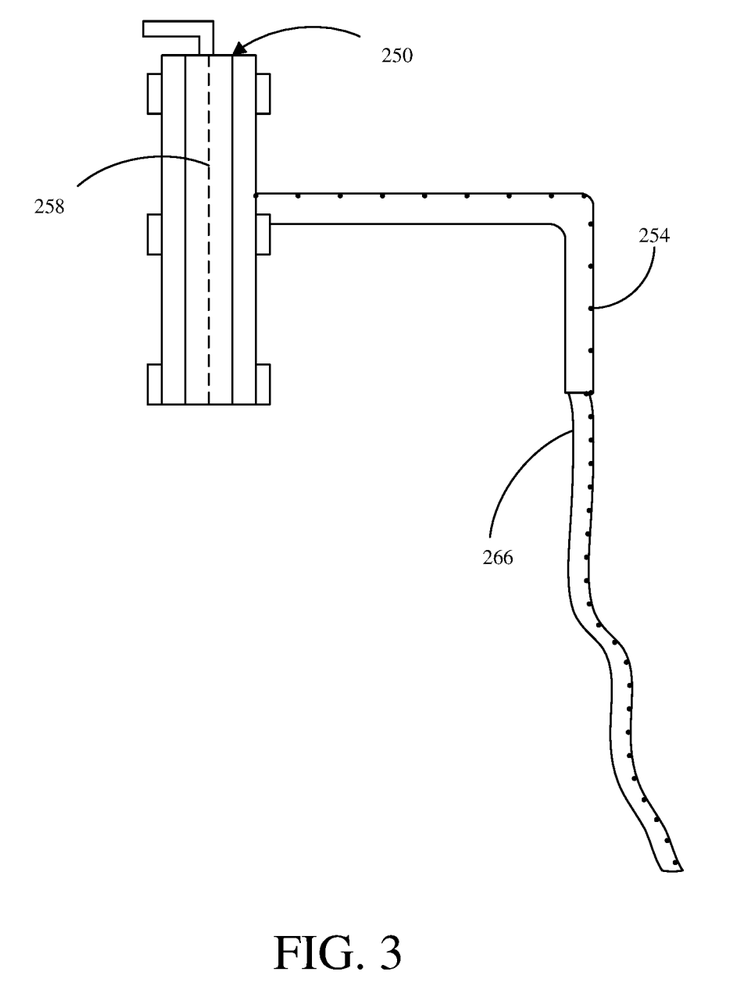
FIG. 3 is a diagrammatic view of a remote seal system in accordance with another embodiment of the present invention.

FIG. 3 is a diagrammatic view of a remote seal system in accordance with another embodiment of the present invention. Many components of the embodiment illustrated in FIG. 3 are similar to those of FIG. 2, and like components are numbered similarly. The primary difference between the embodiment shown in FIG. 3 and that of FIG. 2, is in the form of the averaging temperature sensor. Instead of providing an averaging RTD, the embodiment shown in FIG. 3 employs a plurality of spaced thermocouples (also known as thermopiles) electrically coupled together is series to provide an overall value (such as voltage) that is indicative of an averaged value. Although the implementation using thermocouples could potentially be more difficult to integrate inside the armor of the capillary, thermocouples 254 could be attached to the outside of the armor of the capillary but still be an integral component of the remote seal system.

Because the averaging RTD or thermopiles are integral to the remote seal system, it makes the installation of the RTD or thermocouples a relatively simple matter of connecting to a temperature transmitter. When so connected, the averaging sensor essentially provides the same function as a point-measurement RTD, with some potential adjustments of certain coefficients in the temperature calculation. Further, because the averaging is done by the sensor itself, a temperature transmitter with only a single temperature input (such as that provided by the temperature transmitter sold under the trade designation 3051S Multi-Variable Transmitter from Rosemount Inc. of Shakopee, Minn.) may be used. Such a device can read the average temperature and even apply the compensation calculation, if desired.

Figure 4:
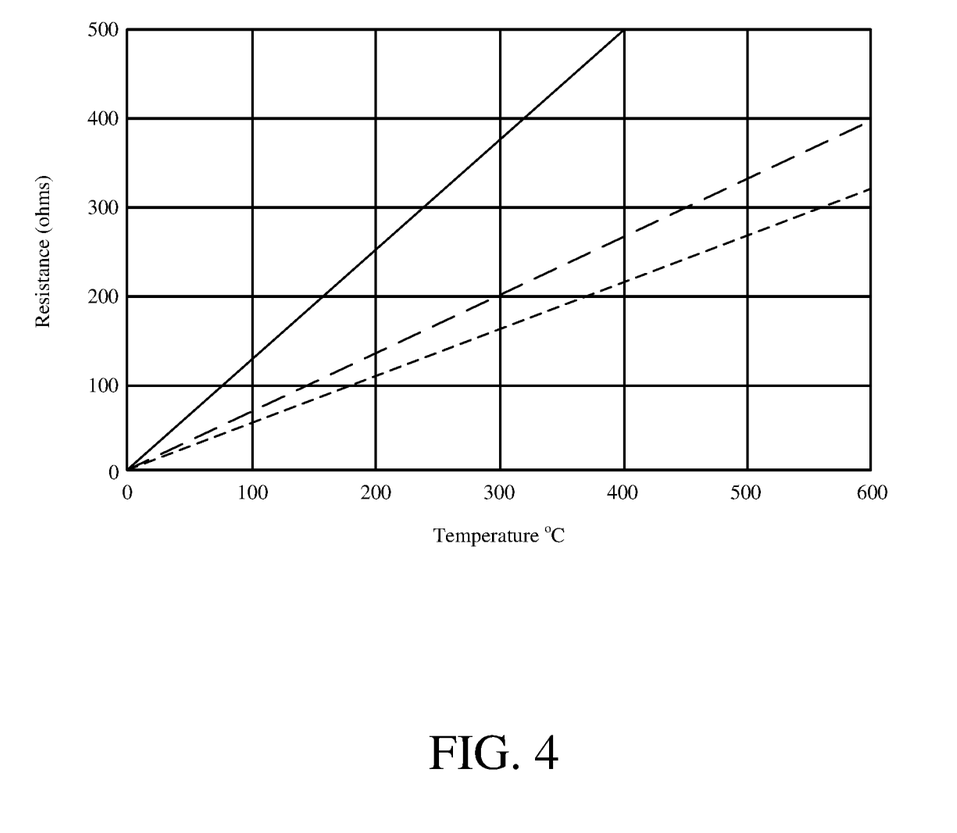
FIG. 4 is a chart illustrating various temperature-based resistance characteristics for three different materials (platinum, copper, and nickel) which may be used for an averaging RTD in accordance with an embodiment of the present invention.

While the embodiments shown and described with respect to FIGS. 3 and 4 provide sensing elements at a continuous or regular interval along the capillary, it is expressly contemplated that the sensing elements can be varied or positioned in a non-uniform manner depending on the application. For example, a portion of a capillary could be custom fit with a temperature sensing element so that only that portion of the capillary that would be vertical would be measured. Additionally, or alternatively, multiple lengths of temperature sensing elements could be provided along the capillary—a first length to account for density effects, and a full length to compensate for volumetric effects (in unbalanced systems).

FIG. 4 is a chart illustrating various temperature-based resistance characteristics for three different materials (platinum, copper, and nickel) which may be used for averaging RTD 164 in accordance with an embodiment of the present invention. As shown in FIG. 4, in the operating range of approximately 0° C. to 400° C. for platinum provides a highly linear output. Further, the resistance of platinum changes more significantly per degree Celsius than that of copper and nickel. However, as shown in FIG. 4, copper and nickel can be used to higher temperatures (600° C.) in a relatively linear region.

Examples of fill fluids that can be used in remote seal capillaries include Silicone 200, Tri-Therm 300, Silicone 704, Silicone 705, UltraTherm™ 805, SYLTHERM™ XLT, inert (halo carbon), Neobee M-20®, glycerin and water, and propylene glycol and water. As an example of a temperature-based parameter of a fill fluid, it is noted that Silicon 704 has a specific gravity at 25° C. of 1.07. Additionally, Silicone 704 has a coefficient of thermal expansion of 0.00095 cc/cc/° C. (0.00053 cc/cc/° F.). Further information regarding various fill fluids and their thermal characteristics can be found in Rosemount DP Level Fill Fluid Specifications, Technical Note 00840-2100-4016, Rev EB, September 2017.

Figure 5:
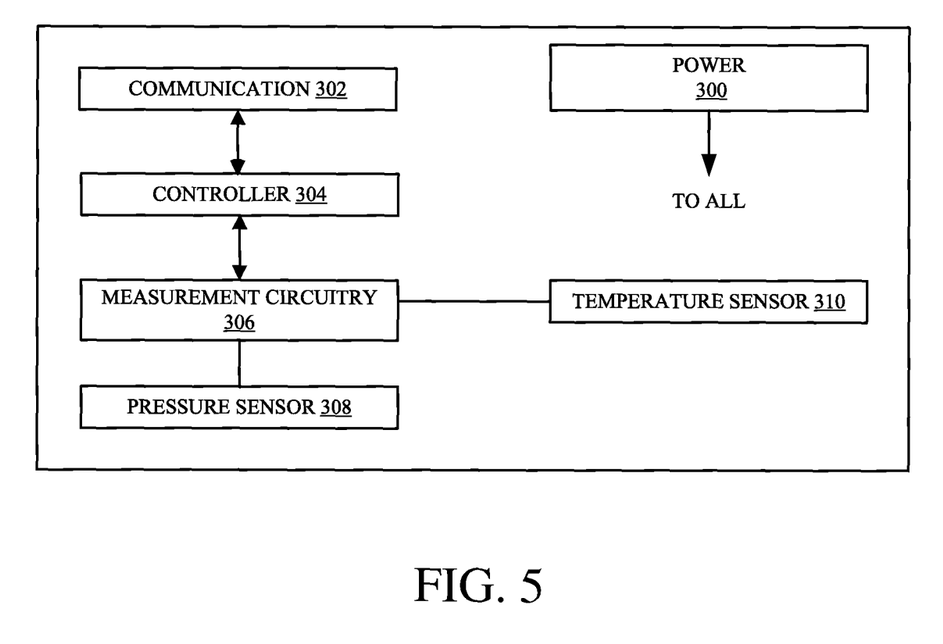
FIG. 5 is a diagrammatic view of electronics within process pressure transmitter in accordance with an embodiment of the present invention.

FIG. 5 is a diagrammatic view of electronics within process fluid pressure transmitter 100. Process pressure transmitter 100 includes power supply module 300 coupled to all circuit components, as indicated by the arrow labelled "to all." In embodiments where process fluid pressure transmitter 100 is coupled to a wired process communication loop, such as a Highway Addressable Remote Transducer (HART®) loop, or a FOUNDATION™ Fieldbus segment, power module 300 may include suitable circuitry to condition power received from the loop or segment to operate the various components of transmitter 100. Accordingly, in such a wired process communication loop embodiments, power supply module 300 may provide suitable power conditioning to allow the entire device to be powered by the loop to which it is coupled. In other embodiments, when wireless process communication is used, power supply module 300 may include a source of power, such as a battery and suitable conditioning circuitry.

Communication circuitry 302 is configured to communicate in accordance with at least one process communication industry standard protocol. Examples of wired process communication industry standard protocols include HART® and the FOUNDATION™ Fieldbus protocol. Additionally, wireless process industry standard protocols can also be employed. For example, the WirelessHART® Protocol (IEC62591) can also be used. Communication circuitry 302 is coupled to controller 304 to provide controller 304 with the ability to communicate on a process industry standard communication loop or segment.

Controller 304 may be any arrangement of logic or circuitry that is able to obtain digital information regarding a pressure sensor signal and provide a process fluid pressure output. In one embodiment, controller 304 is a microprocessor. Controller 304 is coupled to measurement circuitry 306, which is configured to measure an electrical characteristic of a pressure sensor 308. For example, pressure sensor 308 may have a capacitance that changes in response to differential pressure between a pair of process fluid pressure inputs and measurement circuitry 306 is able to provide information indicative of the varying capacitance. In embodiments where the pressure sensor has a resistive signal, measurement circuitry 306, accordingly, is configured to determine the pressure-based resistance. Measurement circuitry 306 may include any suitable combination of analog-to-digital converters, multiplexing circuitry, amplification and/or linearization circuitry, et cetera. Measurement circuitry 306 is coupled to pressure sensor(s) 308 to obtain an indication of process fluid pressure. Controller 304 may include or be coupled to a user interface, in the form of one or more buttons or user-actuatable elements and a display, that allows a user to enter information into process pressure transmitter 100. For example, a user may enter the length of one or more capillaries and/or select among various possible fill fluids within the capillaries. Additionally, or alternatively, the user may enter or otherwise provide the vertical component of the capillary run using the user interface. Additionally, or alternatively, controller 304 may receive information indicative of the fill fluid and/or capillary length via process communication using communication circuitry 302. Additionally, or alternatively, the capillary length and/or capillary vertical length could be pre-programmed into controller 304 during manufacture.

As set forth above, in remote seal systems, the process fluid pressure sensor is located within the process fluid pressure transmitter which is spaced from the process fluid container or conduit by the remote seal. In the embodiment shown in FIG. 5, measurement circuitry 306 is also coupled to averaging temperature sensor(s) 310 that provides an indication of average temperature of at least one capillary. In embodiments where multiple capillaries are used, it is expressly contemplated that multiple such temperature sensors may be used as well. Measurement circuitry 306 provides indications of these average temperatures to controller 304 which may then use information about the particular fill fluid in use, such as those listed above, and various thermal characteristics of such fill fluid in order to compensate the measured process fluid pressure value(s) by the average temperature of each respective conduit. Alternatively, in embodiments with multiple averaging temperature sensors, it is expressly contemplated that the sensors could be wired together or chained in order to obtain a single average for two multiple capillaries.

Figure 6:
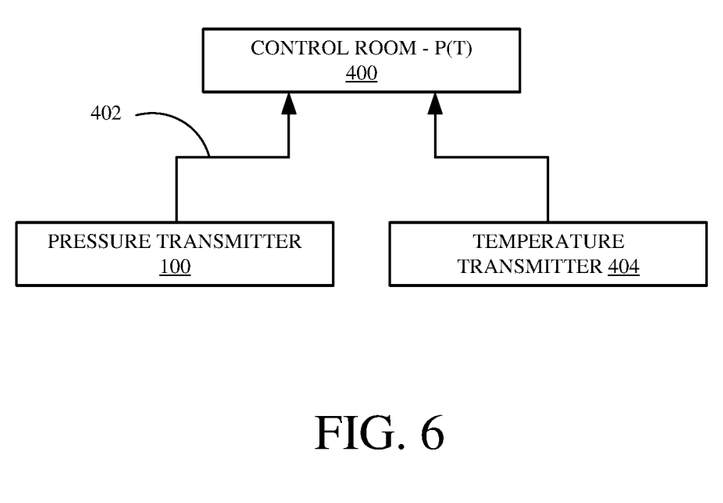
FIG. 6 is a diagrammatic view of a system for compensating process fluid pressure with capillary temperature in accordance with another embodiment of the present invention.

FIG. 6 is a diagrammatic view of a system for compensating process fluid pressure with capillary temperature in accordance with another embodiment of the present invention. FIG. 6 shows a process fluid pressure transmitter 100 that is operably coupled to control room 400 over process communication loop or segment 402. Additionally, one or more capillaries of the process fluid pressure measurement installation include a temperature sensor, as set forth above, that provides an average output of the capillary temperature. Such temperature sensor is coupled to temperature transmitter 404, which, in accordance with known techniques, measures the electrical characteristic (such as resistance) of the averaging temperature sensor and provides an indication thereof over a process communication loop or segment to control room 400. Then, a computer or other suitable processor within control room 400 using knowledge of the particular fill fluid in use by the process fluid pressure transmitter 100, and the temperature reported by temperature transmitter 404, compensates or otherwise adjusts the pressure measurement received from pressure transmitter 100 based on the temperature received from temperature transmitter 404 to provide a temperature-compensated pressure output (P(T)).

Figure 7:
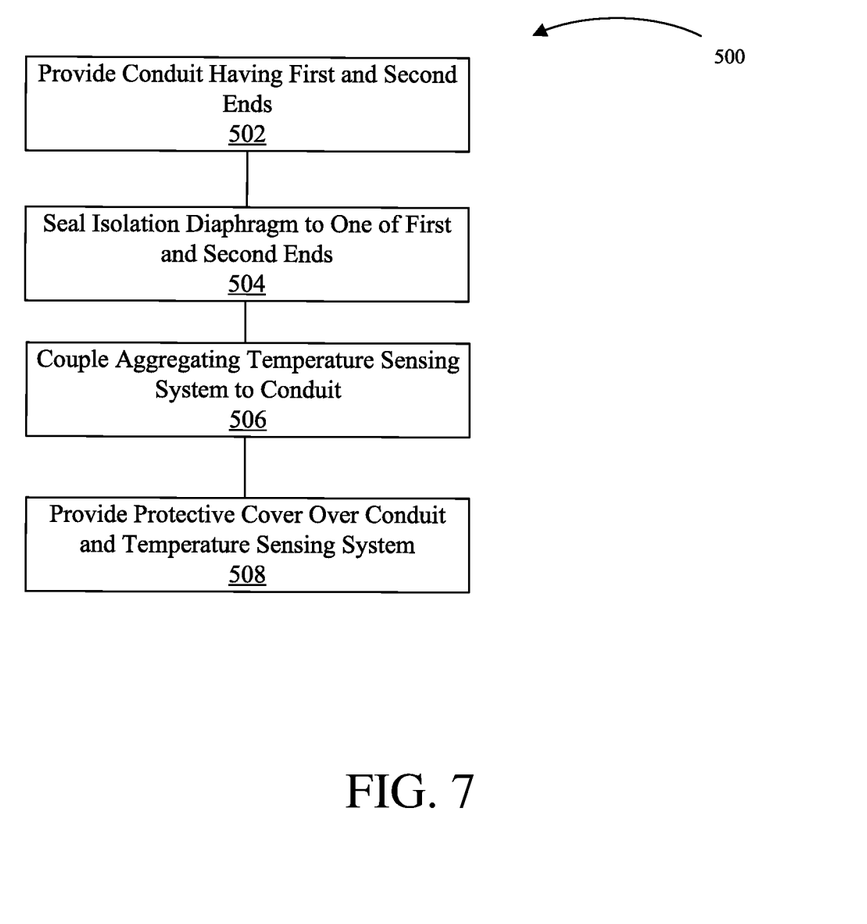
FIG. 7 is a flow diagram of a method of manufacturing a remote seal system in accordance with an embodiment of the present invention.

FIG. 7 is a flow diagram of a method of manufacturing a remote seal system in accordance with an embodiment of the present invention. Method 500 beings at block 502 where a conduit is provided that extends from a first end to a second end and is configured to contain a fill fluid therein. Next, at block 504, an isolation diaphragm is sealed to one of the first and second ends. At block 506, an aggregating temperature sensing system is coupled along at least a length of the conduit. In one example, the aggregating temperature sensing system is an averaging RTD that extends substantially the entire length of the conduit. Next at block 508, a protective material or armor is provided about an exterior diameter of the conduit.

Although the present invention has been described with reference to preferred embodiments, workers skilled in the art will recognize that changes may be made in form and detail without departing from the spirit and scope of the invention.

What is claimed is:

1. A remote seal system, comprising:
    a remote diaphragm having a first side configured to be exposed to a process fluid;
    a conduit having a fill fluid in fluidic communication with a second side of the remote diaphragm; and
    a temperature sensor thermally coupled to the conduit and configured to sense a temperature of the fill fluid, the temperature sensor including a plurality of thermopiles disposed along the conduit.

2. The remote seal system of claim 1, wherein the temperature sensor senses temperature of the till fluid at a plurality of discrete positions along the conduit.

3. The remote seal system of claim 1, wherein the temperature sensor generates a temperature signal indicative of an average temperature of the fill fluid.

4. The remote seal system of claim 1, wherein the temperature sensor includes a resistance temperature device (RTD).

5. The remote seal system of claim 1, wherein the conduit comprises:
    a conduit cover disposed about an exterior diameter of the conduit.

6. The remote seal system of claim 5, wherein the temperature sensor is disposed about the conduit within the conduit cover.

7. The remote, seal system of claim 1, wherein the conduit is configured to couple to a process fluid pressure transmitter.

8. The remote seal system of claim 1, wherein the remote diaphragm is deflected toward the conduit in response to an increase in pressure in the process fluid, and wherein deflection of the remote diaphragm towards the conduit increases pressure in the fill fluid within the conduit.

9. The remote seal system of claim 1, wherein the conduit has a length of at least one meter.

10. A method of manufacturing a remote seal system, the method comprising:
    forming a conduit that extends from a first end to a second end and is configured to contain a fill fluid therein;
    sealingly coupling a diaphragm to one of the first and second ends;
    disposing a protective material about am exterior diameter of the conduit; and
    extending a temperature sensor along the conduit by positioning a series of temperature sensing elements along a length of the conduit, each temperature sensing element being positioned to sense temperature of the fill fluid at a corresponding position between the first and second ends of the conduit.

11. The method of claim 10, further comprising:
    installing the conduit assembly by coupling the diaphragm to a source of process fluid and coupling the other of the first and second ends to a pressure transmitter and connecting the temperature sensor to the pressure transmitter.

12. A remote sensing assembly, comprising:
    a flexible elongate conduit having a first end coupled to a remote diaphragm in fluidic communication with a process fluid and a second end extending a length from the first end to a process fluid pressure transmitter;
    incompressible fill fluid disposed within the flexible elongate conduit;
    the process fluid pressure transmitter being configured to generate an output value indicative of pressure in the process fluid based on a corresponding pressure in the fill fluid;
    a temperature detector coupled to the flexible elongate conduit and configured to provide a signal indicative of an average temperature of the fill fluid along the flexible elongate conduit; and
    a compensation system that calculates a thermal expansion value based on the average temperature and adjusts the pressure signal based on the thermal expansion value.

13. The remote sensing system of claim 12, wherein the flexible elongate conduit is disposed external to the process fluid pressure transmitter, and wherein the temperature detector generates the temperature signal based on an average temperature sensed in the fill fluid to compensate for effects of density, of the fill fluid, on the pressure in the fill fluid.

14. The remote sensing system of claim 12, wherein the process fluid pressure transmitter includes a processor configured to calculate thermal expansion of the fill fluid based on the temperature signal and a length of the flexible elongate conduit.

15. The remote sensing system of claim 14, wherein the length of the flexible elongate conduit is a value provided to the process fluid pressure transmitter via a user interface.

16. The remote sensing system of claim 14, wherein the length of the flexible elongate conduit is provided to the process fluid pressure transmitter via process communication.

17. The remote sensing system of claim 12, wherein the temperature detector is positioned along the flexible conduit in a non-uniform manner.

18. The remote sensing system of claim 12, wherein the temperature detector generates a sensor signal indicative of ambient temperature external to the process fluid pressure transmitter.

19. The remote sensing system of claim 12, wherein the process fluid pressure transmitter stores a value indicative of a length of the flexible elongate conduit, the value being preprogrammed into the process fluid pressure transmitter during manufacture.

20. The remote sensing system of claim 19, wherein the process fluid pressure transmitter also stores a value indicative of a vertical length of the flexible elongate conduit.

* * * * *

UNITED STATES PATENT AND TRADEMARK OFFICE
CERTIFICATE OF CORRECTION

PATENT NO. : 11,009,897 B2
APPLICATION NO. : 16/234900
DATED : May 18, 2021
INVENTOR(S) : David R. Lauzon and Scott R. Thompson Page 1 of 1

It is certified that error appears in the above-identified patent and that said Letters Patent is hereby corrected as shown below:

In the Claims

Column 7, Line 27, Claim 7, delete "," after "remote"

Column 7, Line 43, Claim 10, delete "am" and insert --an--

Column 8, Line 6, Claim 12, insert --an-- before "incompressible"

Signed and Sealed this
Eighth Day of November, 2022

Katherine Kelly Vidal
*Director of the United States Patent and Trademark Office*